(12) United States Patent
Dunaeva et al.

(10) Patent No.: US 8,620,802 B1
(45) Date of Patent: Dec. 31, 2013

(54) CONSUMER-LEVEL FINANCIAL PERFORMANCE ANALYSIS

(75) Inventors: Natalia Dunaeva, San Antonio, TX (US); Timothy Riley, San Antonio, TX (US); Karen Bohanan, San Antonio, TX (US); John Rosilier, San Antonio, TX (US); Jeffrey Spencer, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 13/612,213

(22) Filed: Sep. 12, 2012

Related U.S. Application Data

(60) Provisional application No. 61/539,853, filed on Sep. 27, 2011.

(51) Int. Cl.
*G06Q 40/00* (2012.01)

(52) U.S. Cl.
USPC .............................................. 705/38; 705/37

(58) Field of Classification Search
USPC ...................................................... 705/10–44
See application file for complete search history.

(56) References Cited

U.S. PATENT DOCUMENTS

| | | | |
|---|---|---|---|
| 6,850,982 B1 * | 2/2005 | Siegel | 709/227 |
| 7,689,456 B2 | 3/2010 | Schroeder et al. | |
| 7,730,003 B2 * | 6/2010 | Pinto et al. | 706/21 |
| 7,783,513 B2 * | 8/2010 | Lee | 705/7.42 |
| 7,840,428 B2 | 11/2010 | McNab et al. | |
| 7,941,339 B2 * | 5/2011 | Argaiz | 705/14.49 |
| 7,992,126 B2 | 8/2011 | MacGregor | |
| 8,170,841 B2 * | 5/2012 | Pinto et al. | 703/2 |
| 2003/0069822 A1 * | 4/2003 | Ito et al. | 705/36 |
| 2004/0236734 A1 * | 11/2004 | Yip et al. | 707/3 |
| 2005/0091071 A1 * | 4/2005 | Lee | 705/1 |
| 2005/0096950 A1 | 5/2005 | Caplan et al. | |
| 2006/0143081 A1 * | 6/2006 | Argaiz | 705/14 |
| 2008/0065471 A1 | 3/2008 | Reynolds et al. | |
| 2009/0030756 A1 | 1/2009 | Riley et al. | |
| 2011/0251978 A1 * | 10/2011 | Davies et al. | 705/36 R |

FOREIGN PATENT DOCUMENTS

EP    1675060 A1    6/2006

OTHER PUBLICATIONS

Morgan et al., "The Value of Different Customer Satisfaction and Loyalty Metrics in Predicting Business Performance," Marketing Science, vol. 25, No. 5, Sep.-Oct. 2006, pp. 426-439.

* cited by examiner

*Primary Examiner* — Frantzy Poinvil
(74) *Attorney, Agent, or Firm* — Perkins Coie LLP (57) ABSTRACT

A method of evaluating customers is provided. The method is used for customers of two or more divisions of a business. The method involves collecting information indicative of the customer's influence on division performance metrics of several divisions of a business, where the division performance metrics each influence a business performance metric of the business. After it is collected, the information is electronically stored. The method includes the step of periodically calculating a customer division profit indicator for each of the divisions based on the information. The method also includes the step of periodically calculating a customer business profit indicator based on the customer division profit indicators, where the customer business profit indicator indicates a net influence of the customer on profits of the business. One or more of the customer division profit indicators and the customer business profit indicator are transmitted for display on a display device.

20 Claims, 7 Drawing Sheets

CUSTOMER BUSINESS PROFILES BY DIVISION

| | CUSTOMER 132 | CUSTOMER 134 | CUSTOMER 136 |
|---|---|---|---|
| DIVISION 111 | Size = Medium<br>Profitability = Low<br>Risk = High | | |
| DIVISION 113 | | Size = Small<br>Profitability = Low<br>Risk = Medium | |
| DIVISION 115 | | Size = Medium<br>Profitability = Low<br>Risk = Low | Size = Medium<br>Profitability = Medium<br>Risk = High |
| DIVISION 117 | | | |
| DIVISION 119 | | Size = Very Large<br>Profitability = High<br>Risk = Medium | Size = Large<br>Profitability = High<br>Risk = Low |
| BUSINESS 110 | Size = Medium<br>Profitability = Low<br>Risk = High | Size = Large<br>Profitability = High<br>Risk = Medium | Size = Medium<br>Profitability = Medium<br>Risk = Medium |

CONSUMER-LEVEL FINANCIAL PERFORMANCE ANALYSIS

CROSS-REFERENCE TO RELATED APPLICATIONS

This application claims the benefit of U.S. Provisional Application No. 61/539,853, filed on Sep. 27, 2011, entitled "Consumer-Level Financial Performance Analysis" which is hereby incorporated by reference for all purposes in its entirety.

TECHNICAL FIELD

Various embodiments of the present invention generally relate to evaluating business relationships with customers. More specifically, various embodiments of the present invention relate to calculating business indicators based on the business relationships a customer has with individual divisions of a business.

BACKGROUND

Many large companies, corporations, and other business entities operate their businesses through a variety of divisions, divisions, subsidiaries, branches, or business segments of some other type. In some cases, the business segments may be different departments within a relatively small company which offer different products. In other cases, each different business segment may be a large company which is owned or operated by the same conglomerate or parent company. Many other business structures are possible in which multiple business segments report to the same parent business entity.

In these cases, many customers often do business with more than one division of the business. Because the divisions may offer significantly different products or services, it is sometimes difficult to understand the net impact of a customer's patronage on the business as a whole. The quantity of business a customer undertakes with the various divisions of the business may vary. A customer may be a very small or occasional customer of one division while being a major customer of another division. In addition, the profitability and risk of the customer's business activities with various divisions may vary as well. When a division is making business decisions with respect to a customer, it may be desirable to take into account information describing the customer's relationship with the business as a whole rather than just considering the business with that specific division.

SUMMARY

A method of evaluating customers is provided. The method is used for customers of two or more divisions of a business. The method involves collecting information indicative of the customer's influence on division performance metrics of several divisions of a business, where the division performance metrics each influence a business performance metric of the business. After it is collected, the information is electronically stored. The method includes the step of periodically calculating a customer division profit indicator for each of the divisions based on the information, where each of the customer division profit indicators indicates an influence of the customer on profits of the division. The method also includes the step of periodically calculating a customer business profit indicator based on the customer division profit indicators, where the customer business profit indicator indicates a net influence of the customer on profits of the business. One or more of the customer division profit indicators and the customer business profit indicator are transmitted for display on a display device.

In some embodiments, the method also includes the step of periodically calculating a customer division risk indicator for each of the divisions based on the information, where each of the customer division risk indicators indicates an influence of the customer on business risks of the division. A customer business risk indicator is periodically calculated based on the customer division risk indicators, where the customer business risk indicator indicates a net influence of the customer on business risks of the business. One or more of the customer division risk indicators and the customer business risk indicator are transmitted for display on a display device.

In some embodiments, the method also includes the steps of calculating a customer business value indicator for the customer based on the customer business profit indicator and the customer business risk indicator as well as transmitting the customer business value indicator for display on a display device.

In other embodiments, calculating the customer division profit indicator is further based on projected profit of future business interactions with the customer.

In some embodiments, calculating the customer business profit indicator is further based on a proportional weighting of each of the customer division profit indicators.

In some embodiments, the proportional weighting is determined based on quantities of business the customer conducted with each of the two or more divisions during a specified period of time.

In some embodiments, the divisions provide one or more of the following services to the customer: bank services, insurance services, investment services, real estate services, and retirement planning services.

In some embodiments, one or more of the divisions offers a service to the customer, modifies a service for the customer, or approves a request of the customer based on the business profit indicator.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present invention will be described and explained through the use of the accompanying drawings.

The drawings have not necessarily been drawn to scale. For example, the dimensions of some of the elements in the figures may be expanded or reduced to help improve the understanding of the embodiments of the present invention. Similarly, some components and/or operations may be separated into different blocks or combined into a single block for the purposes of discussion of some of the embodiments of the present invention. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Various embodiments of the present invention generally relate to evaluating customer business relationships. More specifically, various embodiments of the present invention relate to calculating business indicators based on business relationships a customer has with individual divisions of a business.

The embodiments below are primarily described with respect to a financial services institution which has multiple divisions offering different financial products and/or services. The intention, however, is not to limit the invention to implementation by a financial services institution. On the contrary, the invention is intended to cover all implementations falling within the scope of the invention as defined by the appended claims. In the following descriptions, for the purposes of explanation, numerous specific details are set forth in order to provide a thorough understanding of the embodiments of the present invention. It will be apparent, however, to one skilled in the art that embodiments of the present invention may be practiced without some of these specific details.

In some embodiments, a single financial institution may have a number of different branches or divisions offering different financial products to customers. For example, a single financial institution may have divisions which offer bank services, insurance services, investment services, real estate services, retirement planning services, or other services. Individual customers may be offered many, or all, of these services. The types of business interactions a customer undertakes with the different divisions of the financial institution may vary greatly. These different business interactions may vary in terms of magnitude or dollar value, the amount of risk involved, the profitability, or in other ways.

Individual divisions of a business often make decisions with respect to a customer without having a full understanding of the entire business relationship the parent business has with the customer. Making decisions without considering the full extent of the parent business relationship with the customer can be disadvantageous to the division, the business, or both, because the full extent of the profitability, risks, benefits, and disadvantages of the relationships with divisions are not being taken into account. Making decisions without considering the bigger picture of the business relationship and the associated characteristics can, among other things, damage important customer relationships, expose the division or business to too much risk, cause business opportunities to be missed, create inconsistent customer experiences, or reduce overall business profit.

The leadership of the business often receives data about customer profitability primarily at a product level. Decision makers within the business state whether their product is performing well overall, but have limited readily available information about the drivers of financial performance. Businesses are often unable to look at an individual customers' book of business to better understand what financial contributions they provide the business.

This invention provides methods and systems for calculating profitability at a customer or account level. A key part of the solution is the presentation of an integrated view of customer product financial information across different products or different lines of business, with an ability to analyze profitability and risk by customer and by different product characteristics. The invention also provides opportunities for the management of the business or institution to better know its customers, support integrated solutions, optimize marketing efforts, and discontinue expending unnecessary resources.

In some embodiments, this is accomplished by collecting information about a customer's business relationships with two or more divisions of a business and using that information to calculate the profitability of the customer, for each of the divisions of the business. These indicators can then be combined to provide an overall profitability indicator for the customer. These pieces of individual profitability information can then be used to determine the profitability of a customer to the business as a whole when all of the individual relationships with the divisions are considered. A similar process may be performed with respect to the risk associated with each of the business relationships and an overall business value indicator can be determined based on the combination of the profit and the risk associated with the customer.

Figure 1:
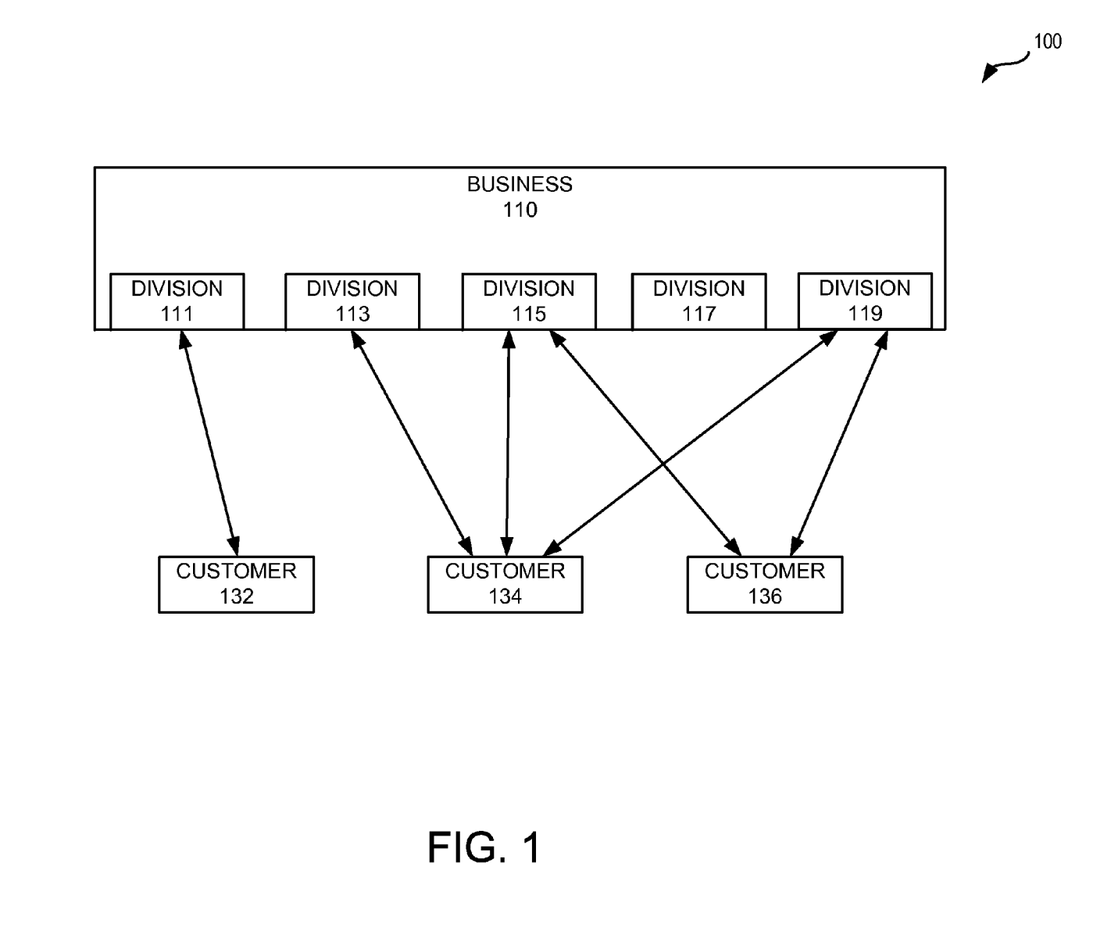
FIG. 1 illustrates an example of an operating environment in which some embodiments of the present invention may be utilized.

Having described embodiments of the present invention generally, attention is directed to FIG. 1 which illustrates operating environment 100 in which some embodiments of the present invention may be utilized. Operating environment 100 comprises business 110, customer 132, customer 134, and customer 136. Business 110 comprises divisions 111, 113, 115, 117, and 119. It should be understood that operating environment 100 many contain many other businesses, but only one is illustrated for purposes of explanation.

Business 110 may be any type of business entity, corporation, partnership, parent company, conglomerate, or business group which operates one or more business activities whether for profit or not. Business 110 is a parent entity of divisions 111, 113, 115, 117, and 119. Divisions 111, 113, 115, 117, and 119 may be subsidiaries, branches, plants, profit centers, divisions, departments, or business subsets of business 110 of some other type. Divisions 111, 113, 115, 117, and 119 may be distinguished from each other by function, product, service, geography, or some other factor. Each of divisions 111, 113, 115, 117, and 119 may be fully owned and operated by business 110 or may be partially owned and/or operated by another business entity. Within a single business, like business 110, many more divisions, and/or types of divisions, are possible. In some cases, a division may not even be owned or operated by business 110. For example, a division could be operated by another company but still have a connection to or impact on business 110 through a partnership, marketing cooperation agreement, or some other type of business relationship.

Each division typically has a relationship with one or more customers. In some cases, a single division will have a relationship with thousands of customers. A very limited number of customers are illustrated in operating environment 100 for purposes of simplicity and explanation. It is possible that a division may provide services or products only internally and may not have an external relationship with a traditional external customer. This invention and the embodiments described herein are equally applicable to those types of divisions serving internal customers.

Each of customers 132, 134, and 136 have business relationships of some type with one or more of divisions 111, 113, 115, 117, and 119 as indicated by lines and arrows. These business relationships may be anything from a single purchase of a single inexpensive product, to a complex ongoing financial services relationship. One or more of the interactions or business relationships may also occur between customers 132 and 134 and business 110 directly. The interactions or business relationships between one customer and multiple divisions may be interrelated or unrelated. These business relationships may also include interactions which are taking place for nonprofit purposes. In the case of nonprofit activities, the costs associated with the relationship may be analyzed rather than the profitability.

Customers 132, 134, and 136 may represent individual people, businesses, governments, corporations, or any other entity or group of people which are receiving a product or service of some type from the divisions. An entity which is represented as a single customer in operating environment 100 may actually include various divisions of a single parent company or entity. In other words, customer 134 may be a business, like business 110, with multiple divisions, and the multiple business relationships of customer 134 may actually involve different divisions of the customer's business.

In one example, business 110 is a financial services institution. In this example, divisions 111, 113, 115, 117, and 119 provide one or more of various types of financial services including banking services, insurance services, investment services, real estate services, retirement planning services, or others. Although this financial services example will be used for purposes of explanation of many of the remaining examples, this example is in no way meant to be limiting. The invention is intended to cover all implementations falling within the scope of the invention as defined by the appended claims.

Figure 2:
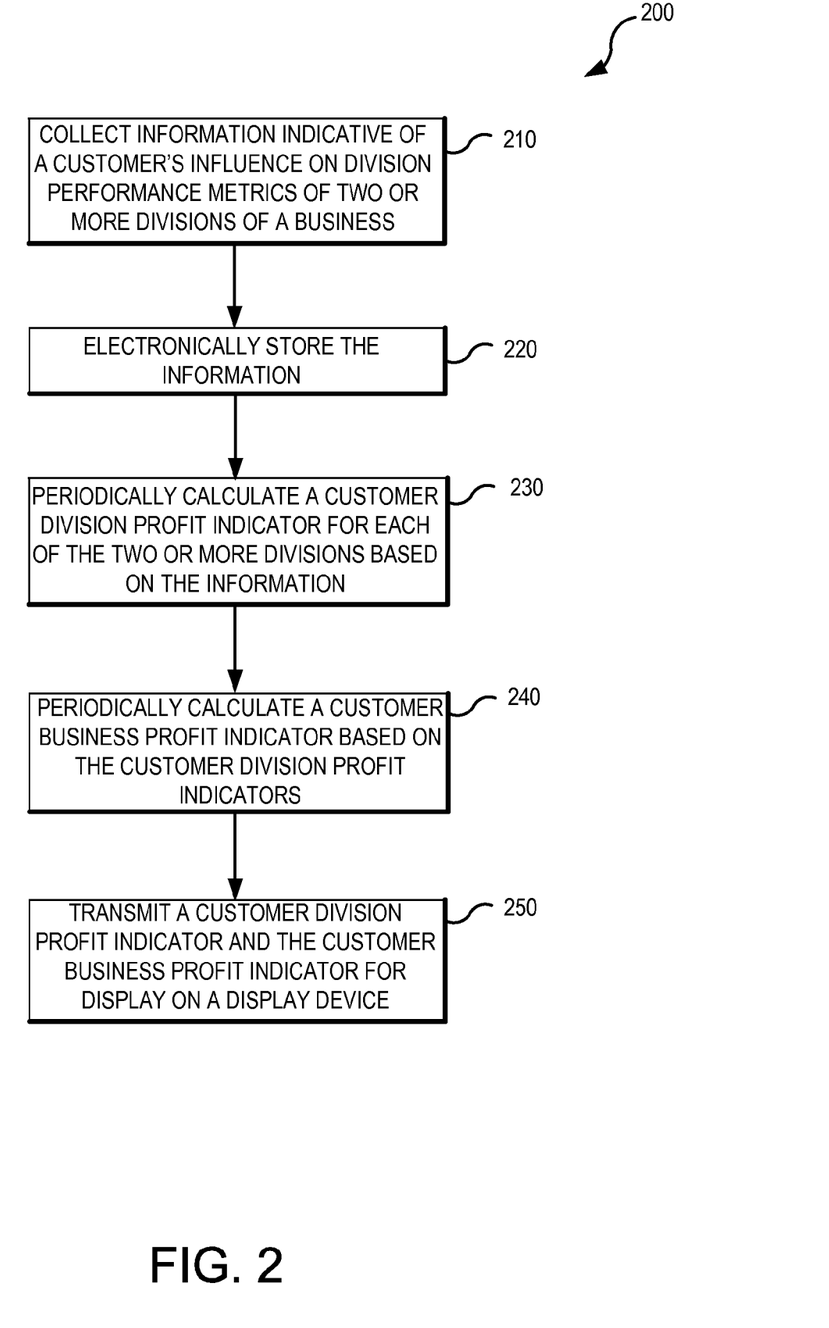
FIG. 2 is a flow chart illustrating a set of operations for evaluating a customer.
Figure 3:
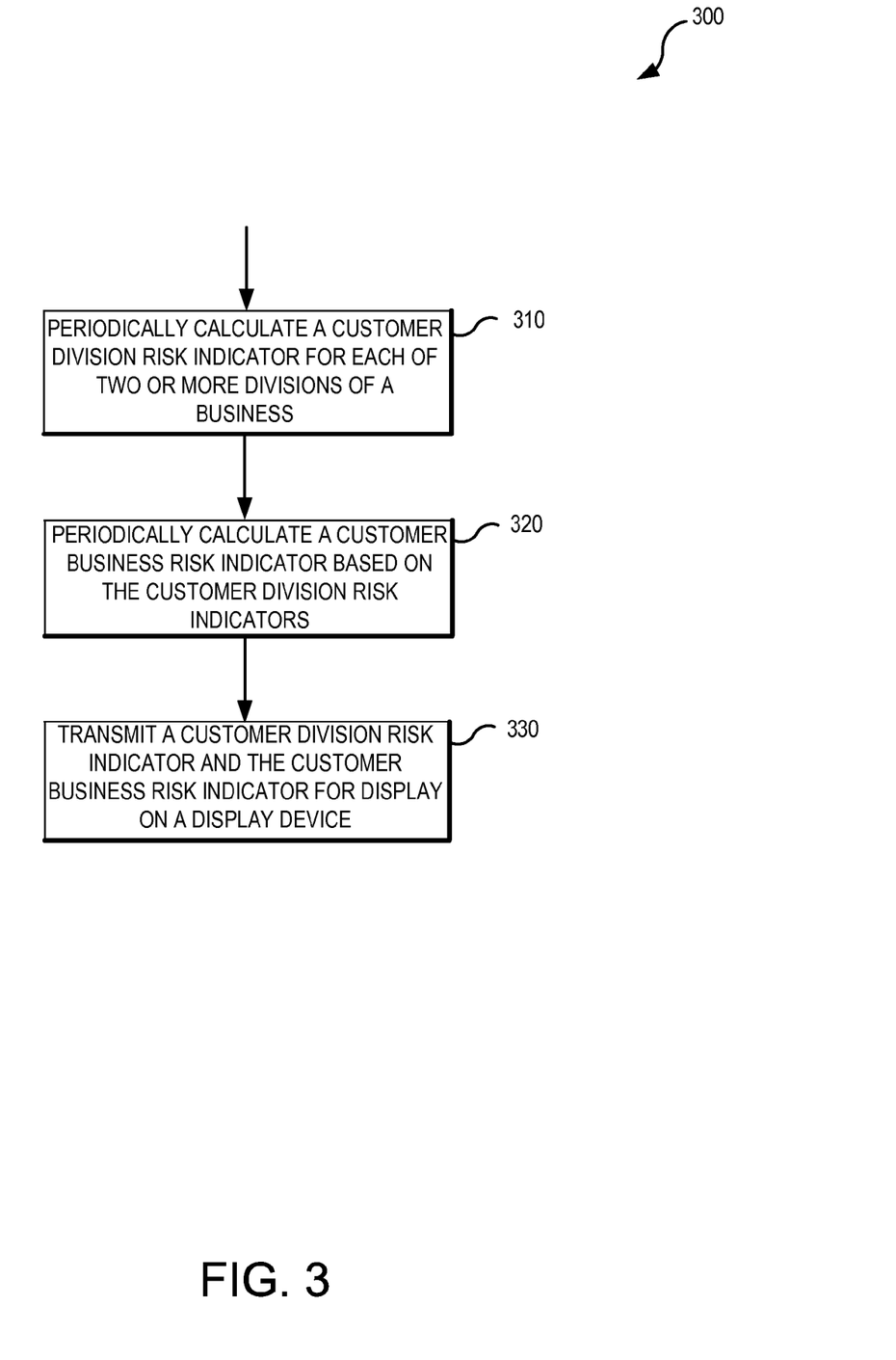
FIG. 3 is a flow chart illustrating a set of operations for evaluating a customer.
Figure 4:
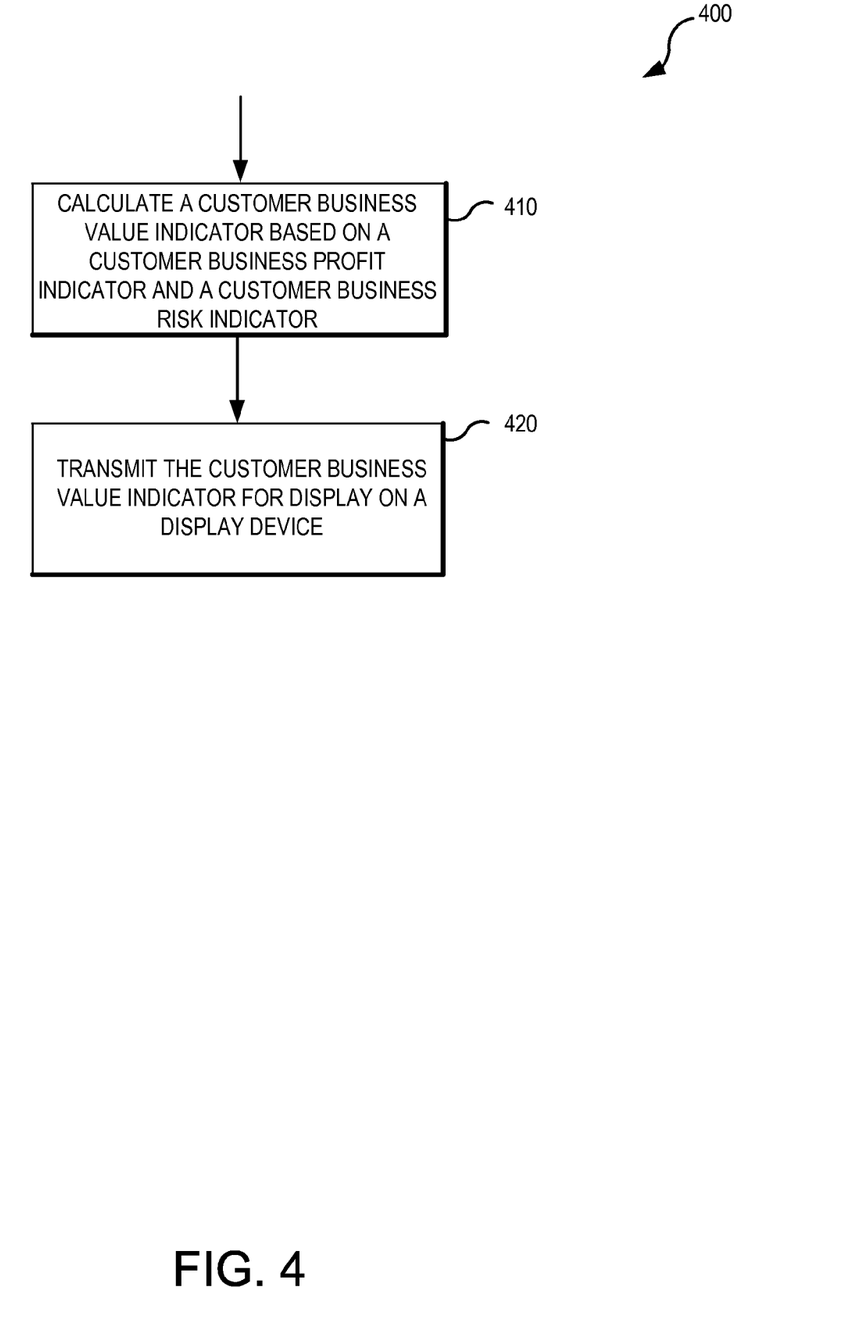
FIG. 4 is a flow chart illustrating a set of operations for evaluating a customer.

FIGS. 2, 3, and 4 are flow charts with various sets of operations. The operations may be performed in various embodiments by one or more components illustrated in FIG. 6, such as processor 620.

FIG. 2 is a flow chart illustrating method 200 for performing a customer evaluation. Method 200 is used for evaluating a customer of two or more divisions of a business. For example, business 110 is a financial services institution with division 115 which provides banking services and division 119 which provides insurance services. Customer 136 is a customer of both divisions.

Method 200 involves collecting information indicative of customer 136's influence on division performance metrics of both division 115 and division 119 (step 210). Because division 115 and division 119 are divisions of business 110, their performance metrics each influence a business performance metric of business 110. Business performance metrics can be profitability, risk, liquidity, customer satisfaction, production volume, return on investment, return on capital, marketshare, or one of many other possible metrics common to the financial and management industries. After the information is collected, it is electronically stored (step 220).

Method 200 further includes the step of periodically calculating a customer division profit indicator for each of division 115 and division 119 based on the information (step 230). Each customer division profit indicator indicates an influence of customer 136 on profits of the division. This may be expressed as an absolute figure, a percentage, a ratio, or simply as an indicator of whether customer 136 is more or less profitable for the division than the average customer for that division.

A customer business profit indicator based on the customer division profit indicators is then periodically calculated (step 240). This customer business profit indicator indicates a net influence of the customer on the profits of business 110. This may be expressed as an absolute figure, a percentage, a ratio, or simply as an indicator of whether customer 136 is more or less profitable for business 110 than the average customer of the business. One or more of the customer division profit indicators and the customer business profit indicator are then transmitted for display on a display device (step 250).

Division 115 may be required to make a decision regarding customer 136. For example, division 115 may need to determine whether to approve a particular loan to customer 136 or may need to determine what type of interest terms to provide customer 136 for a large sum of money being held in an account managed by division 115. Refusal of the loan or issuance of unfavorable interest terms may displease customer 136 or cause customer 136 to discontinue some or all of his or her business with division 115. In addition, customer dissatisfaction may cause the customer to discontinue business with division 119 as well. While division 115 will typically consider the profitability of its own business activities with customer 136 in making decisions, method 200 enables the business interactions between customer 136 and division 119 as well as the overall value of customer 136 to business 110 to be utilized in making this decision.

For example, customer 136 may be a relatively small customer of division 115. Customer 136 may be requesting a loan which may not be very profitable for division 115 and would otherwise typically be denied. However, the division profit indicator for division 119 may indicate that customer 136 is a very profitable insurance customer for division 119. This will be reflected in the business profit indicator for customer 136. Therefore, even though the loan is not very profitable it may make good business sense to make the loan from the standpoint of business 110, even though it may not appear that way when looking only at the division 115 profit indicator for customer 136.

Alternately, the business profit indicator may indicate that customer 136 is not very profitable to business 110 as a whole and the loan may be denied. However, the denial will occur knowing that the potential loss of business from customer 136, in one or both of divisions 115 and 119, will not have a large negative impact on business 110. In this way, business 110 can be operated more profitably because the decision makers within the divisions can make decisions with a better understanding of the potential impacts to business 110 as a whole.

In another example, even though customer 132 currently only has a business relationship with division 111, method 200 can still be used to calculate a business profit indicator in a similar manner. This may be useful for several reasons. First, customer 132 may attempt to start a business relationship with another division of business 110, division 117 for example. Since division 117 has no prior relationship with customer 132, division 117, absent method 200, would have no profit indicators on which to base decisions regarding customer 132. Second, the business profit indicator for business 110 may even be useful for division 111 as it may include other business overhead factors which allow division 111 to make a more complete assessment of the profitability or risk of the business with customer 132 to the parent company.

The profitability determinations in the examples above may be made in a number of ways. For example, profitability determinations may indicate profitability for a fixed recent time period, for a time period since the relationship was started with the customer, based on projected future profit from the customer, or some combination of past and future profit.

FIG. 3 is a flow chart illustrating method 300 for performing a customer evaluation. The steps of method 300 are performed in order to evaluate the risk associated with business relationships of a customer to multiple divisions of a business in a manner similar to the process for evaluating profitably described with respect to FIG. 2. The steps of method 300 are performed based on information similar to that collected and stored in steps 210 and 220 of FIG. 2.

In step 310, a customer division risk indicator is periodically calculated for several or all of the divisions of a business. The customer division risk indicator is similar to the customer division profit indicator of step 230 except that it evaluates or quantifies the risk of the business activity between the customer and the division rather than the profitability. In step 320, a customer business risk indicator is calculated for a single customer with respect to business 110. The customer business risk indicator is similar to the customer business profit indicator of step 240 except that it quantifies or evaluates the risk associated with the customer at the business level rather than the profitability at that level. One or more of the customer division risk indicators and the customer business risk indicator are then transmitted for display on a display device (step 330).

In one example, customer 134 has a large loan through division 115, an insurance policy through division 119, and an investment account through division 113. Customer 113 is requesting a significant increase to the margin capabilities on his investment account. Although the request is such that it may typically be approved, method 300 allows division 113 to easily consider the full risk associated with customer 134 in making this decision. The customer business risk indicator, which encompasses all of the activities customer 134 has with divisions of business 110, may reveal that business 110 is already incurring significant risk associated with customer 134 due to the loan and insurance policy. Based on this information, division 113 may decide to decline, or approve a reduced version of, the margin request. This may not have happened otherwise because division 113 would not have had visibility to full risk business 110 was already carrying with respect to customer 134.

FIG. 4 is a flow chart illustrating method 400 for evaluating a customer. Method 400 is used in conjunction with other methods like method 200 and method 300. In step 410 of method 400, a customer business value indicator is calculated based on a customer business profit indicator and customer business risk indicator. Returning to the example of customer 134, the customer business value indicator for customer 134 takes into account both the profitability and the risk of customer 134's interactions with each of division 113, division 115, and division 119. Any part of business 110 can use this information to evaluate decisions regarding customer 134 with a better understanding of the potential business implications for business 110 of those decisions. The customer business value indicator is then transmitted for display on a display device (step 420).

The business profit and business risk indicators in the examples above may be calculated using a proportional weighting of the individual division indicators. For example, the division profit indicators of division 115 and division 119 for customer 136 may not weigh equally into the calculation of the business profit indicator for customer 136. The weighting could be based on a variety of different factors. In one example, the weighting is based on the quantity of business the customer conducted with each of the two divisions over a given time period. These quantities of business alone may be compared to each other to determine the weighting or the quantities may be first divided by the overall size of the business conducted by each division to create a ratio which is not only dependent on the size of the customer's business with each division but also the relative size of the two divisions with respect to each other.

Figure 5:
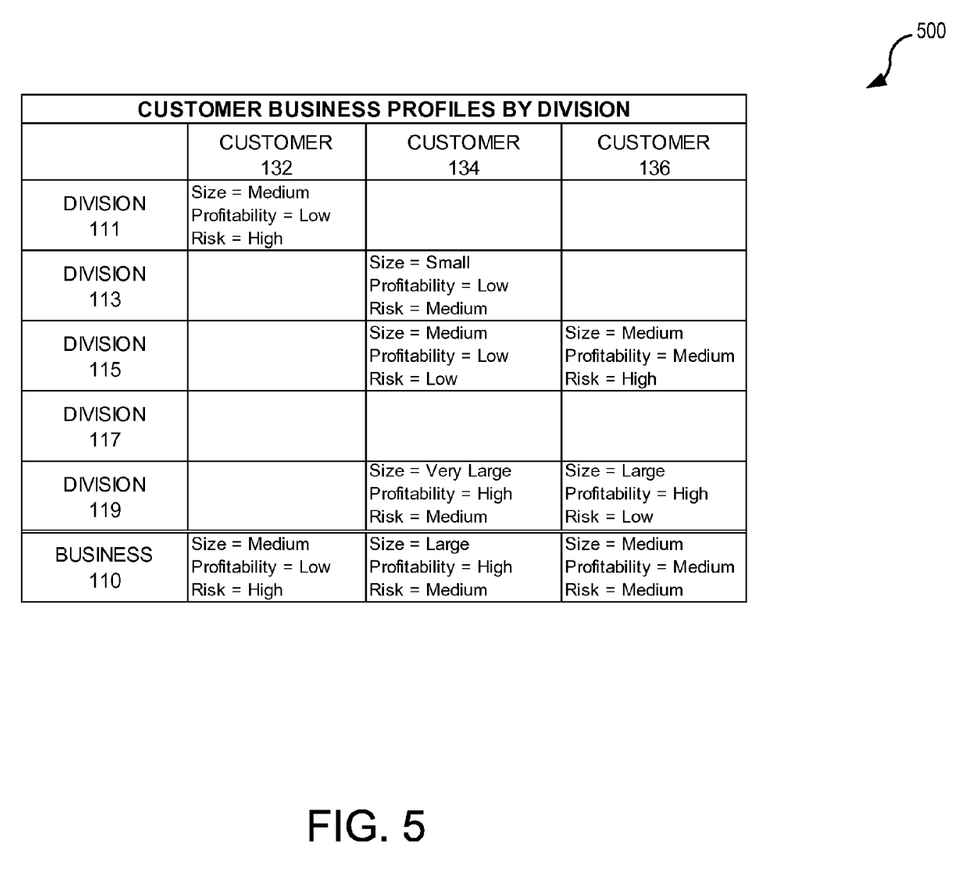
FIG. 5 is a table illustrating a set of customer business profiles.

FIG. 5 illustrates table 500 which contains a set of customer business profiles. Table 500 provides a summary of business relationships between customers 132, 134, and 136 and divisions 111, 113, 115, 117, and 119 as described in previous examples, although the specific scenario illustrated in table 500 may differ from those previous examples.

In table 500, non-numerical indicators are assigned which indicate the size, profitability, and risk associated with each of the individual customer/division relationships. Quantitative indicators are also possible in some or all cases.

For example, in the customer 132/division 111 relationship, the profitability is designated as "low." This designation performs a function similar to the customer division profit indicator of step 230 of FIG. 2. An indicator of the risk associated with the business activities is included as well. In this case, these activities are designated high risk. The relative size of the business activities or transactions associated with this relationship is designated as "medium." These designations may be relative to the business activities of division 111 only or relative to the business activities of all of the divisions in business 110. Similar indications are provided for each of the other customer/division pairs. Many other types and variations of non-numerical indicators are possible including combinations of numerical and non-numerical indicators.

Based on the non-numerical indicators associated with each division, business level indicators are determined for each of customers 132, 134, and 136 as indicated in the last row of table 500. The profitability and risk indicators are similar to the customer business profit indicator of step 240 and the customer business risk indicator of step 320. A size indicator is also included which provides an overall indication of the relative size of the business associated with each customer. This size may be determined in a weighted or non-weighted fashion.

Similar to previous examples, the business indicators may be used by divisions to make division level decisions with respect to individual customers in a more informed fashion. For example, customer 134 may be requesting an unusual modification to the terms of an investment account with division 113. Division 113 may be hesitant to do this because there is significant risk and/or cost associated with doing so. Division 113 may be further hesitant to do this because customer 134 only represents a small piece of business relative to their division and that business is also not very profitable. However, the availability of the business level indicators reveals that customer 134 is a large and highly profitable for business 110 when all of the divisions are taken into account. This information may tip the decision of division 113 regarding the investment account the other direction resulting in a more beneficial decision when the overall business with customer 134 is taken into account.

The information in table 500 may also be used for other purposes. The information may be used to market products or services to specific customers or segments of customers. The information may be used to make decisions about new product or service offerings or modifications to existing product or service offerings. The information may also be used to make other management, operational, or strategic decisions concerning business 110, divisions 111, 113, 115, 117, and 119, or any combination thereof.

Figure 6:
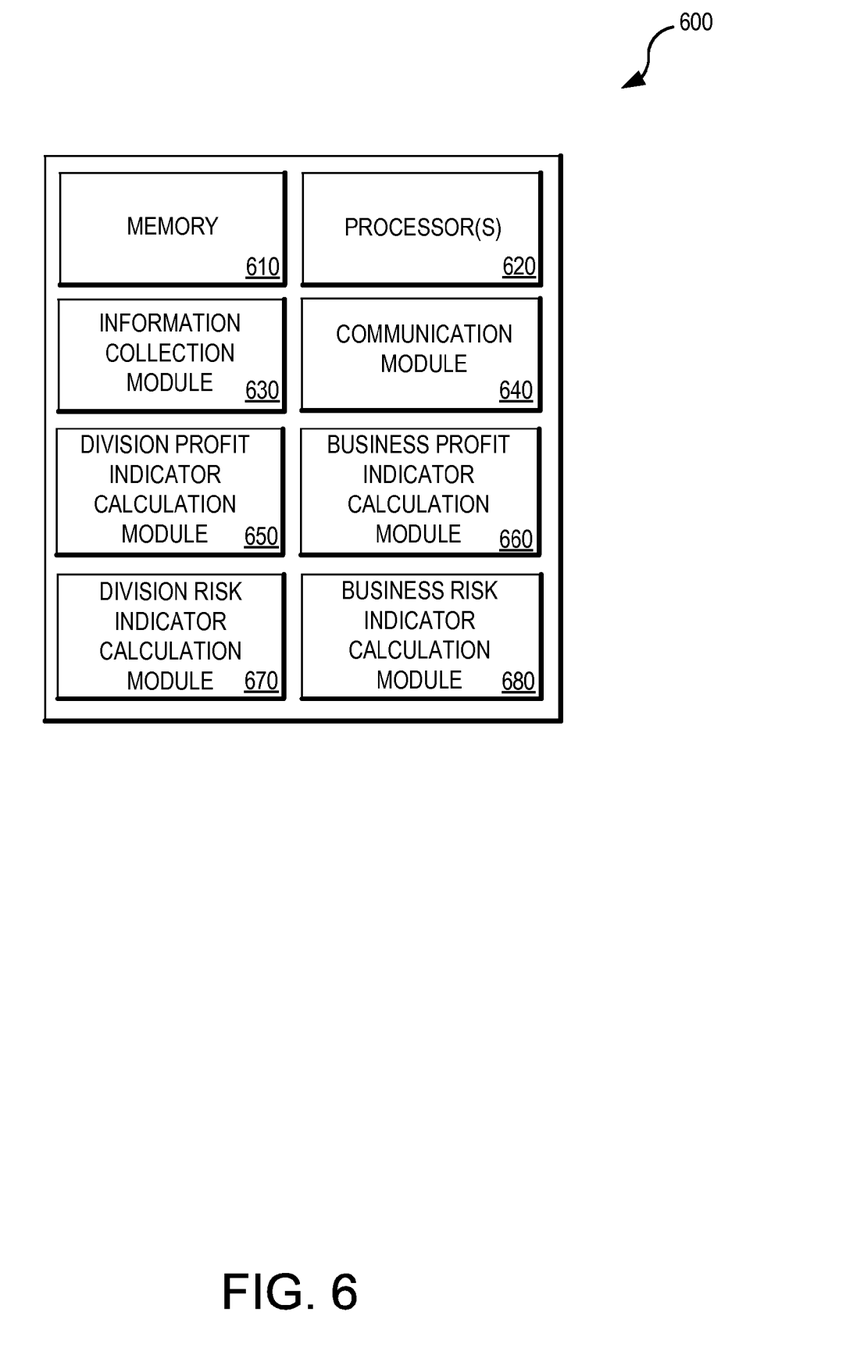
FIG. 6 illustrates an example of a system with modules with which some embodiments of the present invention may be utilized.

FIG. 6 is a block diagram illustrating exemplary components that can be included in a customer evaluation system 600 in accordance with various embodiments of the present invention. According to the embodiments shown in FIG. 6, customer evaluation system 600 can include memory 610, one or more processors 620, information collection module 630, communication module 640, division profit indicator calculation module 650, business profit indicator calculation module 660, division risk indicator calculation module 670, and business risk indicator calculation module 680. Other embodiments of the present invention may include some, all, or none of these modules and components along with other modules, applications, and/or components. Still yet, some embodiments may incorporate two or more of these modules into a single module and/or associate a portion of the functionality of one or more of these modules with a different module.

For example, in one embodiment, the functionality associated with division profit indicator calculation module 650 and business profit indicator calculation module 660 can be incorporated into a single profit indicator calculation module. As another example, in one embodiment, information collection module 630 can be separated into an information screening module and an information processing module.

Memory 610 can be any device, mechanism, or populated data structure used for storing information. In accordance with some embodiments of the present invention, memory 610 can encompass any type of, but is not limited to, volatile memory, nonvolatile memory, and dynamic memory. For example, memory 610 can be random access memory, memory storage devices, optical memory devices, media magnetic media, floppy disks, magnetic tapes, hard drives, SIMMs, SDRAM, DIMMs, RDRAM, DDR RAM, SODIMMS, erasable programmable read-only memories (EPROMs), electrically erasable programmable read-only memories (EEPROMs), compact disks, DVDs, and/or the like. In accordance with some embodiments, memory 610 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 610.

Memory 610 may be used to store instructions for running one or more applications or modules on processor(s) 620. For example, memory 610 could be used in one or more embodiments to house all or some of the instructions needed to execute the functionality of any combination of modules 630-680.

Information collection module 630 is configured to collect information indicative of a customer's influence on division performance metrics of several divisions of a business. Division profit indicator calculation module 650 is configured to periodically calculate a customer division profit indicator for each of the divisions based on the collected information. Business profit indicator calculation module 660 is configured to periodically calculate a customer business profit indicator based on the customer division profit indicators. Division risk indicator calculation module 670 and business risk indicator calculation module 680 are configured to calculate risk indicators in manners similar to the profit indicator calculations. One or more of the profit and risk indicators are transmitted by communication module 640 for display on a display device. The transmission to the display device may occur through a network.

Exemplary Computer System Overview

Figure 7:
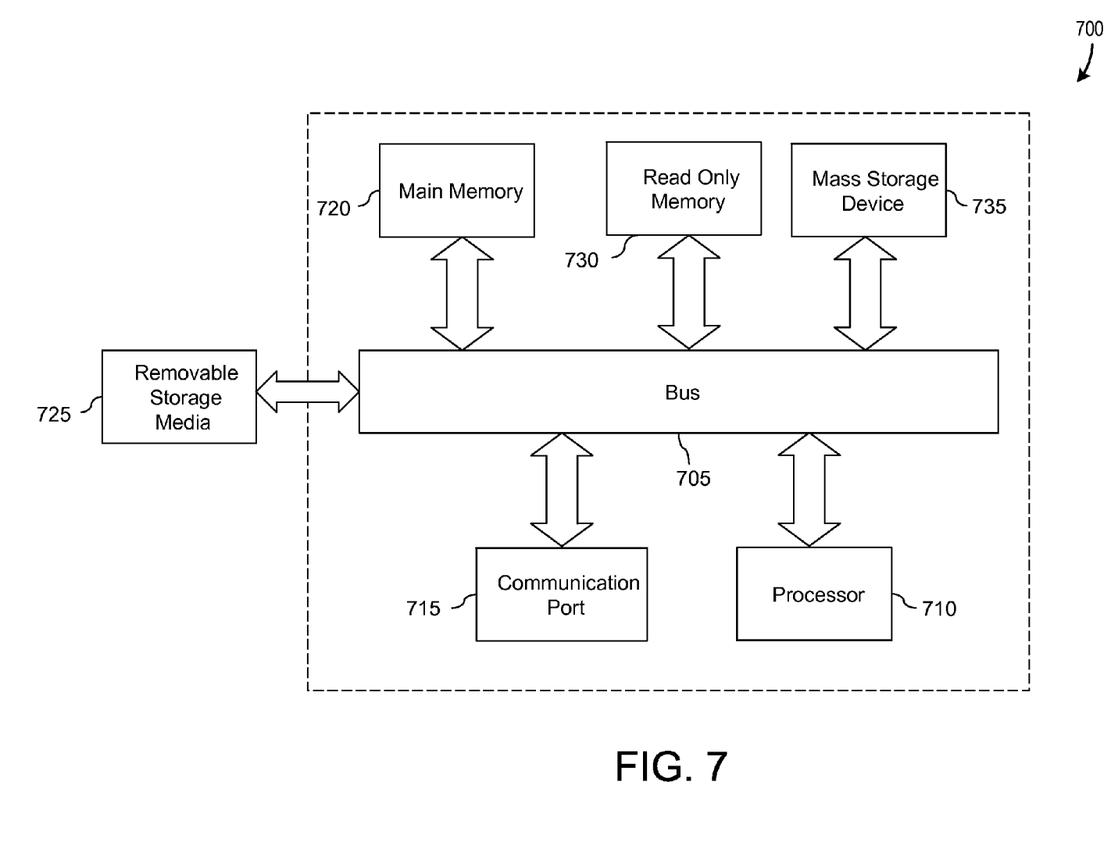
FIG. 7 illustrates an example of a computer system with which some embodiments of the present invention may be utilized.

Embodiments of the present invention include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 7 is an example of a computer system 700 with which embodiments of the present invention may be utilized. According to the present example, the computer system includes a bus 705, at least one processor 710, at least one communication port 715, a main memory 720, a removable storage media 725, a read only memory 730, and a mass storage 735.

Processor(s) 710 can be any known processor, such as, but not limited to, an Intel® Itanium® or Itanium 2® processor(s), or AMD® Opteron® or Athlon MP® processor(s), or Motorola® lines of processors. Communication port(s) 715 can be any of an RS-232 port for use with a modem based dialup connection, a 10/100 Ethernet port, or a Gigabit port using copper or fiber. Communication port(s) 715 may be chosen depending on a network such a Local Area Network (LAN), Wide Area Network (WAN), or any network to which the computer system 700 connects.

Main memory 720 can be Random Access Memory (RAM), or any other dynamic storage device(s) commonly known in the art. Read only memory 730 can be any static storage device(s) such as Programmable Read Only Memory (PROM) chips for storing static information such as instructions for processor 710.

Mass storage 735 can be used to store information and instructions. For example, hard disks such as the Adaptec® family of SCSI drives, an optical disc, an array of disks such as RAID, such as the Adaptec family of RAID drives, or any other mass storage devices may be used.

Bus 705 communicatively couples processor(s) 710 with the other memory, storage, and communication blocks. Bus 705 can be a PCI/PCI-X or SCSI based system bus depending on the storage devices used.

Removable storage media 725 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

The components described above are meant to exemplify some types of possibilities. In no way should the aforementioned examples limit the scope of the invention, as they are only exemplary embodiments.

TERMINOLOGY

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," and the like generally mean the particular feature, structure, or characteristic following the phrase is included in at least one embodiment of the present invention, and may be included in more than one embodiment of the present invention. In addition, such phrases do not necessarily refer to the same embodiments or different embodiments.

If the specification states a component or feature "may", "can", "could", or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs), interconnected via gateways operable to facilitate communications between and among the various networks.

Embodiments of the present invention may be provided as a computer program product which may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

While, for convenience, embodiments of the present invention are described with reference to a financial institution, embodiments of the present invention are equally applicable to various other types of business entities. The invention is intended to cover all implementations falling within the scope of the invention as defined by the appended claims.

Also, for the sake of illustration, various embodiments of the present invention have herein been described in the context of computer programs, physical components, and logical interactions within modern computer networks. Importantly, while these embodiments describe various aspects of the invention in relation to modern computer networks and programs, the method and apparatus described herein are equally applicable to other systems, devices, and networks as one skilled in the art will appreciate. As such, the illustrated applications of the embodiments of the present invention are not meant to be limiting, but instead exemplary. Other systems, devices, and networks to which embodiments of the present invention are applicable include, but are not limited to, other types of communication and computer devices and systems. More specifically, embodiments are applicable to communication systems, services, and devices such as cell phone networks and compatible devices. In addition, embodiments are applicable to all levels of computing from the personal computer to large network mainframes and servers.

In conclusion, the present invention provides novel systems, methods, instructions, and arrangements for systems and methods to evaluate customers. While detailed descriptions of one or more embodiments of the invention have been given above, various alternatives, modifications, and equivalents will be apparent to those skilled in the art without varying from the spirit of the invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof. Therefore, the above description should not be taken as limiting the scope of the invention, which is defined by the appended claims.

What is claimed is:

1. A customer evaluation method comprising:
for a customer of two or more of a plurality of divisions of a business, collecting information indicative of the customer's influence on division performance metrics of each of the two or more divisions, wherein the division performance metrics each influence a business performance metric of the business;
electronically storing the information;
periodically calculating, by a processor, a customer division profit indicator for each of the two or more divisions based on the information, wherein each of the customer division profit indicators indicates an influence of the customer on profits of the division associated with that customer division profit indicator;
periodically calculating, by the processor, a customer business profit indicator based on the customer division profit indicators, wherein the customer business profit indicator indicates a net influence of the customer on profits of the business; and
transmitting one or more of the customer division profit indicators and the customer business profit indicator for display on a display device.

2. The method of claim 1, further comprising:
periodically calculating, by the processor, a customer division risk indicator for each of the two or more divisions based on the information, wherein each of the customer division risk indicators indicates an influence of the customer on business risks of the division associated with that customer division risk indicator;
periodically calculating, by the processor, a customer business risk indicator based on the customer division risk indicators, wherein the customer business risk indicator indicates a net influence of the customer on business risks of the business; and transmitting one or more of the customer division risk indicators and the customer business risk indicator for display on a display device.

3. The method of claim 2 further comprising:

calculating, by the processor, a customer business value indicator based on the customer business profit indicator and the customer business risk indicator; and transmitting the customer business value indicator for display on a display device.

4. The method of claim 1 wherein calculating the customer division profit indicator is further based on projected profit of future business interactions with the customer.

5. The method of claim 1 wherein calculating the customer business profit indicator is further based on a proportional weighting of each of the customer division profit indicators.

6. The method of claim 5 wherein the proportional weighting is determined based on quantities of business the customer conducted with each of the two or more divisions during a specified period of time.

7. The method of claim 1 wherein the plurality of divisions provide one or more services to the customer from the group of bank services, insurance services, investment services, real estate services, and retirement planning services.

8. The method of claim 1 further comprising:

based on the customer business profit indicator, one of the plurality of divisions performing one or more of the group of: offering a service to the customer, modifying a service for the customer, and approving a request of the customer.

9. A non-transitory computer readable medium comprising instructions which, when executed by a processor, direct the processor to perform a method comprising:

for a customer of two or more of a plurality of divisions of a business, collecting information indicative of the customer's influence on division performance metrics of each of the two or more divisions, wherein the division performance metrics each influence a business performance metric of the business;

electronically storing the information;

periodically calculating a customer division profit indicator for each of the two or more divisions based on the information, wherein each of the customer division profit indicators indicates an influence of the customer on profits of the division associated with that customer division profit indicator;

periodically calculating a customer business profit indicator based on the customer division profit indicators, wherein the customer business profit indicator indicates a net influence of the customer on profits of the business; and transmitting one or more of the customer division profit indicators and the customer business profit indicator for display on a display device.

10. The computer readable medium of claim 9 wherein the method further comprises:

periodically calculating a customer division risk indicator for each of the two or more divisions based on the information, wherein each of the customer division risk indicators indicates an influence of the customer on business risks of the division associated with that customer division risk indicator;

periodically calculating a customer business risk indicator based on the customer division risk indicators, wherein the customer business risk indicator indicates a net influence of the customer on business risks of the business; and transmitting one or more of the customer division risk indicators and the customer business risk indicator for display on a display device.

11. The computer readable medium of claim 10 wherein the method further comprises:

calculating a customer business value indicator based on the customer business profit indicator and the customer business risk indicator; and transmitting the customer business value indicator for display on a display device.

12. The computer readable medium of claim 9 wherein calculating the customer division profit indicator is further based on projected profit of future business interactions with the customer.

13. The computer readable medium of claim 9 wherein calculating the customer business profit indicator is further based on a proportional weighting of each of the customer division profit indicators, and wherein the proportional weighting is determined based on quantities of business the customer conducted with each of the two or more divisions during a specified period of time.

14. The computer readable medium of claim 9 wherein the plurality of divisions provide one or more services to the customer from the group of bank services, insurance services, investment services, real estate services, and retirement planning services.

15. The computer readable medium of claim 9 wherein the method further comprises:

based on the customer business profit indicator, one of the plurality of divisions performing one or more of the group of: offering a service to the customer, modifying a service for the customer, and approving a request of the customer.

16. A system for evaluating customers comprising:

a display;

a communication interface; and a processor configured to:

for a customer of two or more of a plurality of divisions of a business, collect information indicative of the customer's influence on division performance metrics of each of the two or more divisions, wherein the division performance metrics each influence a business performance metric of the business;

electronically store the information;

periodically calculate a customer division profit indicator for each of the two or more divisions based on the information, wherein each of the customer division profit indicators indicates an influence of the customer on profits of the division associated with that customer division profit indicator;

periodically calculate a customer business profit indicator based on the customer division profit indicators, wherein the customer business profit indicator indicates a net influence of the customer on profits of the business; and transmit one or more of the customer division profit indicators and the customer business profit indicator to the display through the communication interface.

17. The system of claim 16 wherein the processor is further configured to:

periodically calculate a customer division risk indicator for each of the two or more divisions based on the information, wherein each of the customer division risk indicators indicates an influence of the customer on business risks of the division associated with that customer division risk indicator;

periodically calculate a customer business risk indicator based on the customer division risk indicators, wherein the customer business risk indicator indicates a net influence of the customer on business risks of the business; and transmit one or more of the customer division risk indicators and the customer business risk indicator to the display through the communication interface.

18. The system of claim 17 wherein the processor is further configured to:

calculate a customer business value indicator based on the customer business profit indicator and the customer business risk indicator; and transmit the customer business value indicator to the display through the communication interface.

19. The system of claim 16 wherein calculating the customer business profit indicator is further based on a proportional weighting of each of the customer division profit indicators, and wherein the proportional weighting is determined based on quantities of business the customer conducted with each of the two or more divisions during a specified period of time.

20. The system of claim 16 wherein the plurality of divisions provide one or more services to the customer from the group of bank services, insurance services, investment services, real estate services, and retirement planning services.

* * * * *